(12) United States Patent
Tone

(10) Patent No.: US 6,308,368 B1
(45) Date of Patent: Oct. 30, 2001

(54) CLEANING PAD

(75) Inventor: Yasuyoshi Tone, Yokohama (JP)

(73) Assignee: Patent KG, Corporation, Tokyo (JP)

( * ) Notice: Subject to any disclaimer, the term of this patent is extended or adjusted under 35 U.S.C. 154(b) by 0 days.

(21) Appl. No.: 09/451,766

(22) Filed: Dec. 1, 1999

(30) Foreign Application Priority Data

Mar. 23, 1999 (JP) .................................................. 11-077726

(51) Int. Cl.$^7$ ..................................................... A47L 11/02
(52) U.S. Cl. ...................... 15/230; 15/230.1; 15/230.16; 428/66.6; 428/97
(58) Field of Search .................................... 15/230, 230.1, 15/230.12, 230.15–230.17; 428/66.6, 97, 131, 92, 167, 172

(56) References Cited

U.S. PATENT DOCUMENTS

| 3,728,075 | * | 4/1973 | Cannan ........................... 15/230.16 X |
| 4,403,367 | * | 9/1983 | Brown et al. ...................... 15/230.12 |
| 4,961,243 | * | 10/1990 | Barber ..................................... 15/230 |
| 5,893,191 | * | 4/1999 | Schneider et al. ................. 15/230.12 |

\* cited by examiner

*Primary Examiner*—Mark Spisich

(57) ABSTRACT

The present invention relates to a cleaning pad mounted on a rotary pad base of a floor cleaning device when in use. The cleaning pad in accordance with the present invention comprises a base cloth and a fiber layer made by implanting threads made of 70 to 90 wt % cotton and 10 to 30 wt % nylon into the base cloth in a tufted manner.

8 Claims, 2 Drawing Sheets

CLEANING PAD

BACKGROUND OF THE INVENTION

1. Field of the Invention

The present invention relates to a cleaning pad mounted on a rotary pad base of a floor cleaning device when in use.

2. Description of the Prior Art

In a conventional method for cleaning a floor, a cleaning pad is mounted on the resin—made rotary pad base of a floor cleaning device, and the pad base is rotated at about 1500 rpm with the cleaning pad in contact with the floor, and the cleaning pad is moved on the floor.

However, in the case where the floor receives flaws on the surface and dirt is embedded in the flaws, it is impossible to remove the dirt on the floor effectively.

Therefore, in recent years, the new method has been employed which has following steps: resin wax mixed with thermally reactive resin is previously applied to the surface of the floor; the pad base is rotated at 1500 to 2500 rpm with the cleaning pad in contact with the floor; the cleaning pad is moved on the surface of the floor to soften the resin wax by the frictional heat to remove small bumps on the surface of the resin wax; and thereby restoring the surface of the resin wax to a state of mirror.

In this respect, a coil pad made of nylon fibers formed in a coil, a pad made of nonwoven fabric made of chemical fibers such as polyester fiber and having a thickness of about 2 cm or the like is used as the cleaning pad.

However, since the cleaning pad like this has air permeability, it does not much increase the temperature of the resin wax and hence does not sufficiently soften the resin wax. Therefore, the small bumps on the surface of the resin wax can not sufficiently be removed and thus the surface of the resin wax can not surely be restored to the state of mirror. Therefore, the cleaning pad is required to be moved on the floor many times.

SUMMARY OF THE INVENTION

It is an object of the present invention to provide a cleaning pad capable of surely restoring the surface of resin wax applied to the surface of a floor to a state of mirror.

The present invention provides a cleaning pad comprising a base cloth and a fiber layer made by implanting threads comprising 70 to 90 wt % cotton and 10 to 30 wt % nylon into the base cloth in a tufted manner and mounted on a rotary pad base of a floor cleaning device when in use.

In this cleaning pad, since mainly the nylon of the fiber layer generates frictional heat and the cotton of the fiber layer can prevent the heat from leaking, the resin wax applied to the surface of the floor is sufficiently softened and hence the surface of the resin wax can surely be restored to a state of mirror.

BRIEF DESCRIPTION OF THE INVENTION

DETAILED DESCRIPTION OF THE INVENTION

Figure 1:
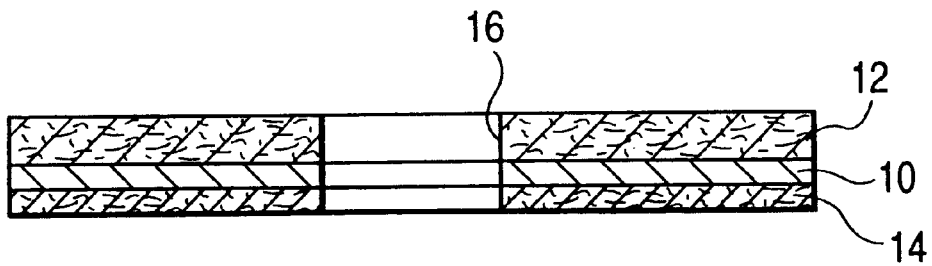
FIG. 1 is a schematic cross sectional view showing the cleaning pad in accordance with the present invention.
Figure 2:
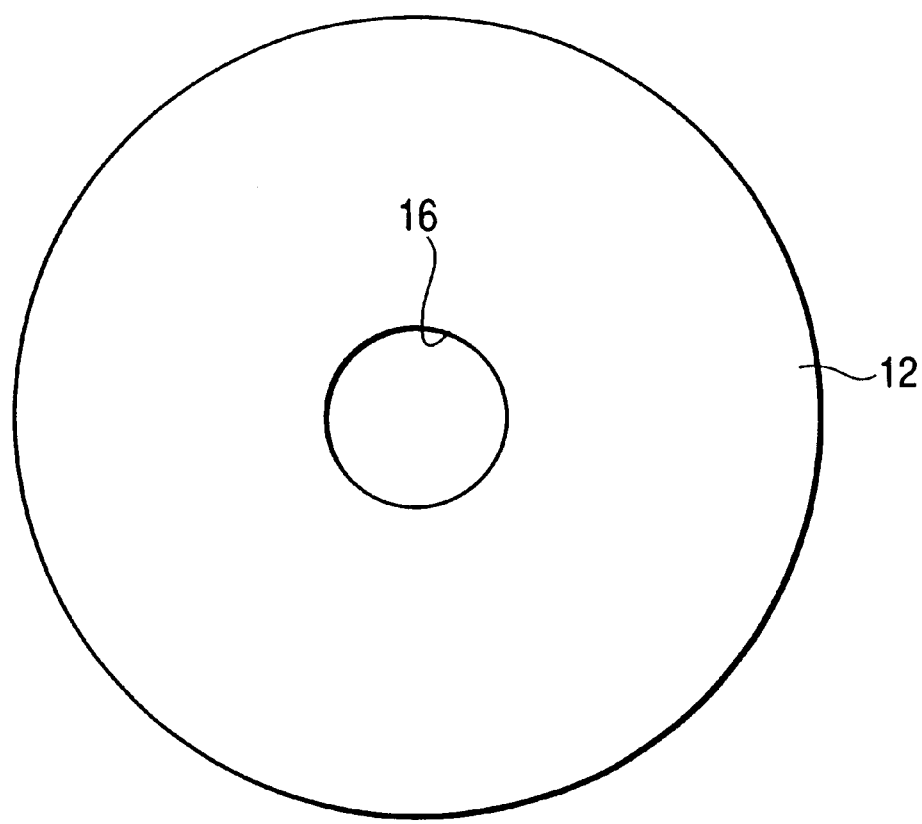
FIG. 2 is a schematic plan view showing the cleaning pad shown in FIG. 1.

A cleaning pad in accordance with the present invention will be described with reference to FIG. 1 and FIG. 2. A fiber layer 12 having a thickness of about 1 cm is made on the surface of a base cloth 10. The fiber layer 12 is made by implanting the threads made by twisting 80 wt % cotton spun yarn and 20 wt % nylon filament into the base cloth 10 in a tufted manner. That is, the above-mentioned threads are implanted into the base cloth 10 in a tufted manner to form the fiber layer 12. Further, a backing member 14 made of felt is mounted on the back surface of the base cloth 10. The cleaning pad is cut to be a circular as the whole and has a circular hole 16 at the center.

When the cleaning pad is mounted on a rotary pad base of a floor cleaning device and the pad base is rotated at 1500 to 2500 rpm with the fiber layer 12 of the cleaning pad in contact with the surface of the floor coated with resin wax, mainly the nylon filaments of the fiber layer 12 generate frictional heat. The cotton spun yarn of the fiber layer 12 can prevent the frictional heat from leaking so as to increase the temperature of the resin wax applied to the surface of the floor to 40 to 80° C., thereby softening the resin wax sufficiently. This can sufficiently remove the small bumps on the surface of the resin wax to surely restore the surface of the resin wax to a state of mirror. Therefore, it is necessary only to move the cleaning pad on the floor one time and hence it is possible to clean the floor effectively.

Figure 3:
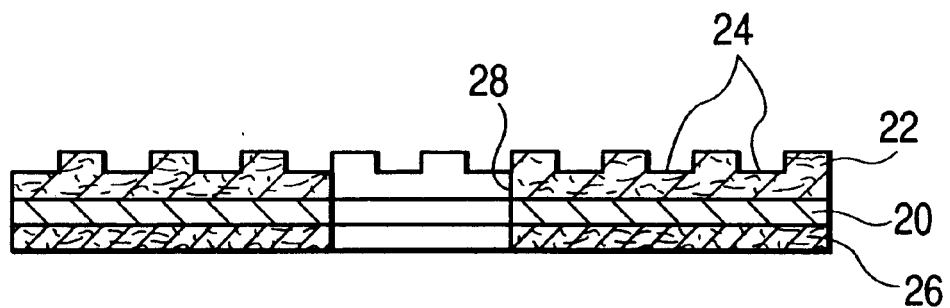
FIG. 3 is a schematic cross sectional view showing another cleaning pad in accordance with the present invention.
Figure 4:
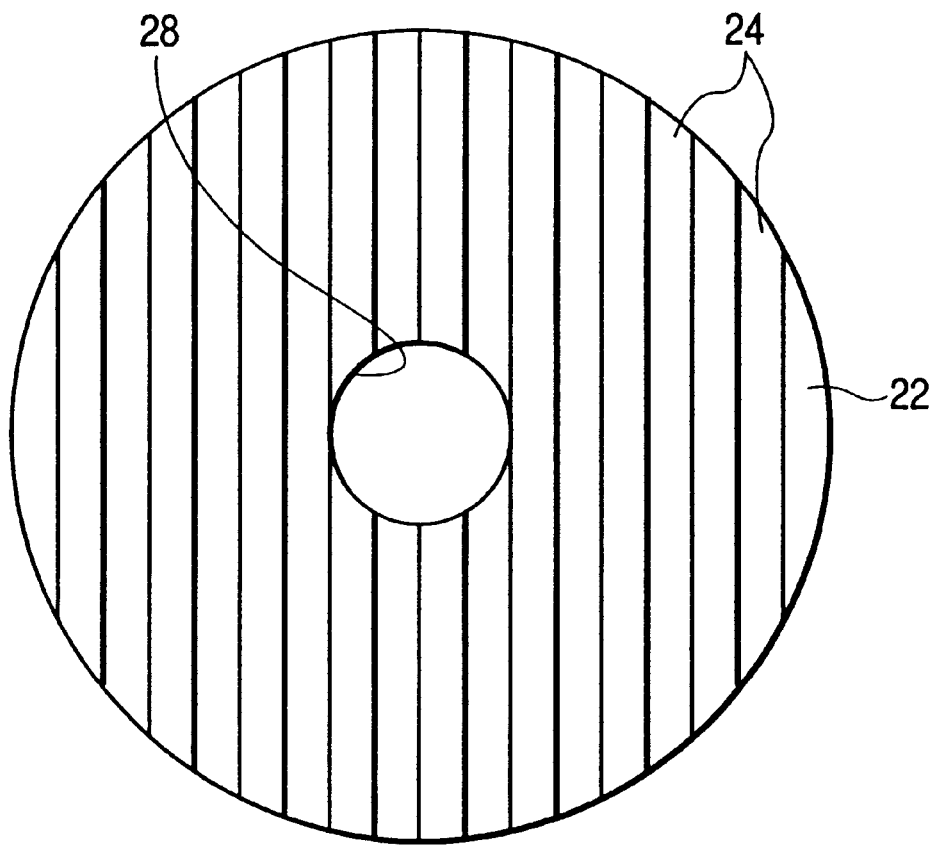
FIG. 4 is a schematic plan view showing the cleaning pad shown in FIG. 3.

Another cleaning pad in accordance with the present invention will be described with reference to FIG. 3 and FIG. 4. A fiber layer 22 having a thickness of about 1 cm is made on the surface of a base cloth 20. The fiber layer 22 is made by implanting threads made by twisting 80 wt % cotton spun yarn and 20 wt % nylon filament into the base cloth 20 in a tufted manner. Further, the fiber layer 22 has grooves 24 having a width of 4.5 cm. The grooves 24 can be made by changing the lengths of the above-mentioned threads implanted into the base cloth 20. Further, a backing member 26 made of felt is mounted on the back surface of the base cloth 20. The cleaning pad is cut to be circular as a whole and has a circular hole 28 at the center.

In this cleaning pad, since the grooves 24 function as a radiator to prevent the temperature of the resin wax from increasing extremely, thereby preventing the generation of a burned mark on the resin wax.

In this respect, in the above-mentioned embodiment, the grooves 24 are made by changing the lengths of the above-mentioned threads implanted into the base cloth 20, but it is also possible that part of looped threads implanted into the base cloth 20 are cut and that the grooves 24 are made in the portion where the threads are not cut. Further, in the above-mentioned embodiment, the threads made by twisting 80 wt % cotton spun yarn and 20 wt % nylon filament are used. However, the threads made of 70 to 90 wt % of cotton and 10 to 30 wt % nylon may be used, and preferably, the threads made of 75 to 85 wt % cotton and 15 to 25 wt % nylon may be used, and further, more preferably, the threads made of 78 to 82 wt % cotton and 18 to 22 wt % nylon may be used.

What is claimed is:

1. A cleaning pad mounted on a rotary pad base of a floor cleaning device when in use, said cleaning pad comprising:
   a) a base cloth; and
   b) a fiber layer made by implanting threads comprising 70 to 90 wt % cotton and 10 to 30 wt % nylon into said base cloth in a tufted manner.

2. The cleaning pad according to claim 1, wherein said cleaning pad has a hole at the center.

3. The cleaning pad according to claim 1, wherein said fiber layer has grooves.

4. The cleaning pad according to claim 1, wherein said fiber layer is made by implanting said threads made by twisting 70 to 90 wt % cotton spun yarn and 10 to 30 wt % nylon filament into said base cloth in a tufted manner.

5. The cleaning pad according to claim 1, wherein a backing member is mounted on the back surface of said base cloth.

6. The cleaning pad according to claim 5, wherein said backing member is made of felt.

7. The cleaning pad according to claim 1, wherein said fiber layer is made by implanting said threads comprising 75 to 85 wt % cotton spun yarn and 15 to 25 wt % nylon filament into said base cloth in a tufted manner.

8. The cleaning pad according to claim 1, wherein said fiber layer is made by implanting said threads comprising 78 to 82 wt % cotton spun yarn and 18 to 22 wt % nylon filament into said base cloth in a tufted manner.

* * * * *